(12) United States Patent
Ieradi

(10) Patent No.: US 11,201,374 B2
(45) Date of Patent: Dec. 14, 2021

(54) ELECTRIC VEHICLE BATTERY SYSTEM

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 211 days.

(21) Appl. No.: 16/682,584

(22) Filed: Nov. 13, 2019

(65) Prior Publication Data

US 2021/0143381 A1 May 13, 2021

(51) Int. Cl.
| | |
|---|---|
| *B60K 1/04* | (2019.01) |
| *H01M 50/20* | (2021.01) |
| *H01M 10/625* | (2014.01) |
| *H01M 10/613* | (2014.01) |

(52) U.S. Cl.
CPC ......... *H01M 50/20* (2021.01); *H01M 10/613* (2015.04); *H01M 10/625* (2015.04); *B60K 2001/0416* (2013.01); *B60K 2001/0427* (2013.01); *B60K 2001/0438* (2013.01); *H01M 2250/20* (2013.01)

(58) Field of Classification Search
CPC ............ B60L 50/64; B60L 50/66; B60K 1/04
See application file for complete search history.

(56) References Cited

U.S. PATENT DOCUMENTS

| | | | |
|---|---|---|---|
| 5,833,023 A | 11/1998 | Shimizu | |
| 7,128,179 B2 * | 10/2006 | Szymanski | ........... B66F 9/0754 180/68.5 |
| 7,520,355 B2 | 4/2009 | Chaney | |
| 8,672,354 B2 | 3/2014 | Kim et al. | |
| 10,632,857 B2 * | 4/2020 | Matecki | .................. B60L 50/66 |
| 2002/0185320 A1 * | 12/2002 | Murase | ............... B66F 9/07531 180/68.5 |
| 2005/0092536 A1 * | 5/2005 | Takeda | .................... B60L 50/60 180/68.5 |
| 2009/0320715 A1 | 12/2009 | Morita et al. | |
| 2012/0312610 A1 | 12/2012 | Kim et al. | |

(Continued)

OTHER PUBLICATIONS

Notification of Transmittal of the International Search Report and the Written Opinion of the International Searching Authority, or the Declaration, issued in International Application No. PCT/CA2020/051550, dated Jan. 20, 2021.

*Primary Examiner* — James A Shriver, II
*Assistant Examiner* — James J Triggs
(74) *Attorney, Agent, or Firm* — Norton Rose Fulbright Canada LLP

(57) ABSTRACT

A holding structure forming at least part of a vehicle chassis for housing battery modules is disclosed herein. The holding structure has two side members, at least one of the side members defines one or more first apertures for receiving one or more battery modules of the battery modules. The holding structure may have at least one cross member that extends between the two side members. The holding structure has at least one mounting member projecting from the at least one cross member that is parallel to the two side members and that defines a plurality of second apertures that are each laterally displaced from a respective aperture of the plurality of first apertures. When received by a mounting member, the battery module extends through an aperture of the plurality of second apertures and the respective aperture of the plurality of first apertures.

20 Claims, 12 Drawing Sheets

(56) References Cited

U.S. PATENT DOCUMENTS

| | | | |
|---|---|---|---|
| 2013/0153315 A1* | 6/2013 | Yu | H01M 50/256 |
| | | | 180/68.5 |
| 2013/0161105 A1* | 6/2013 | Maguire | B60K 1/04 |
| | | | 180/68.5 |
| 2013/0175829 A1 | 7/2013 | Kim et al. | |
| 2018/0105062 A1 | 4/2018 | Fees et al. | |
| 2019/0016231 A1 | 1/2019 | Scaringe et al. | |
| 2019/0237724 A1* | 8/2019 | Kawaguchi | B60L 50/66 |
| 2019/0370467 A1* | 12/2019 | Li | H04L 9/3234 |
| 2019/0382051 A1* | 12/2019 | Toyota | B62D 25/2036 |

* cited by examiner

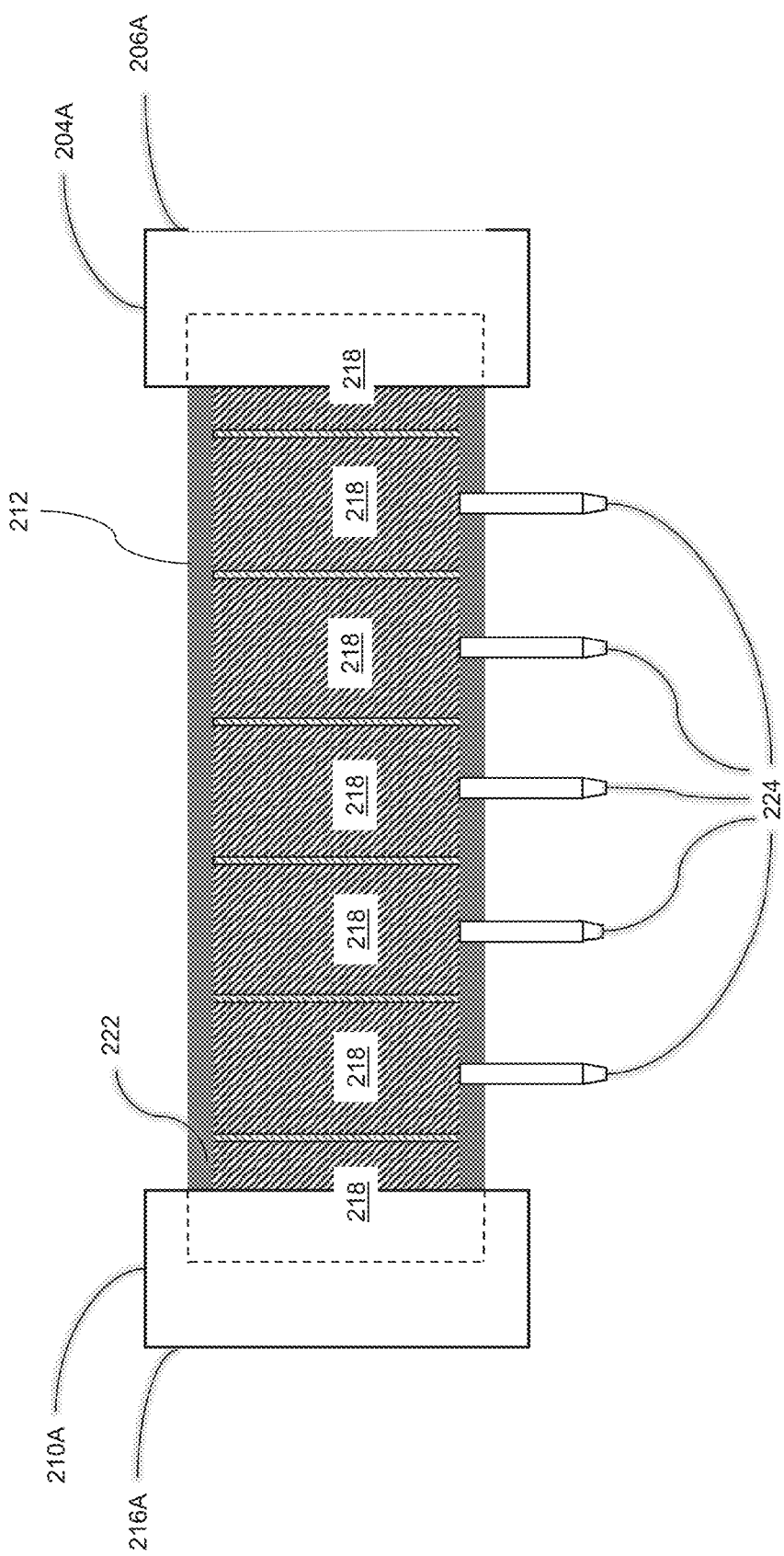

ELECTRIC VEHICLE BATTERY SYSTEM

TECHNICAL FIELD

The disclosure relates generally to electric vehicles, and more particularly a battery system for an electric vehicle.

BACKGROUND

An electric vehicle uses a battery pack storing electrical energy to power an electric motor that provides mechanical force to drive the vehicle. Electric vehicles have a limited driving range (distance per charge). One way to extend a driving range of an electric car is to increase the amount of electrical energy stored in the battery pack. This may be done by increasing a size of the battery modules or increasing the number of battery modules within the battery pack for example. A battery module consists of several battery cells connected in parallel or series. However, increasing the number of battery modules in an electric vehicle increases the weight of the vehicle and consequently increases the amount of electrical energy consumed by the vehicle when driving making the vehicle less efficient.

SUMMARY

Electric vehicles may have battery packs (i.e. plurality of battery modules) with a battery capacity of roughly 50-100 kwh that can weigh 1000 to 1500 lbs. However, drivers often do not need to leverage all of the power that can be supplied by these battery packs, for instance in a case of a short distance drive. The average daily commute may require a vehicle to use 8-10 kwh of energy. In this case, the vehicle may only be leveraging a small portion of a battery pack. In some embodiments, example vehicles described herein may reduce an amount of power consumption by reducing weight of the vehicle when driving. Decreasing the weight of the vehicle may decrease the power consumption of vehicle when driving. Vehicle described herein may allow a driver to tailor a number of battery modules to be inserted into vehicle based on specific situations to minimize an amount of electrical energy consumption. For example, in some situations, it may be desirable to insert additional battery modules into a holding structure of the vehicle to travel longer distances.

A holding structure for batteries according to this disclosure may be provided and form part of the chassis of a passenger vehicle, pick-up truck, transport truck, or any other automobile. The holding structure may house one or more batteries. The one or more batteries may comprise a primary battery, which in an example may be configured to hold a desired charge, e.g. a power charge sufficient to travel an average daily travelling range of approximately 62 miles. The primary battery may be used individually without any other batteries within the holding structure. Additional batteries may be inserted into the housing structure for increased travelling range of the vehicle. The additional batteries may be removed when not in use. Reducing the weight of the vehicle may reduce power consumption by the vehicle when it travels—improving energy efficiency by reducing consumption per unit of distanced travelled. The holding structure may also be configured to act as a heat sink for the batteries to provide cooling which may reduce discharge losses and promote energy efficiency of the batteries.

Batteries not in use by a vehicle may be used in other electric vehicle as needed, e.g. through a rental pool organized by a dealer, energy station, amongst a user's own vehicles, etc. As a result, consumption of raw materials to create batteries may be reduced as the batteries may be shared amongst multiple users or vehicles.

In one aspect, the disclosure describes a holding structure forming at least part of a vehicle chassis for housing a plurality of battery modules, the holding structure comprising: two side members, at least one side member of the two side members defining one or more first apertures for selectably receiving one or more battery modules of the plurality of battery modules; at least one cross member that extends between the two side members; and at least one mounting member projecting from the at least one cross member, the at least one mounting member is parallel to the two side members and that defines a plurality of second apertures that are each laterally displaced from a respective aperture of the plurality of first apertures; wherein when a battery module is received by the at least one mounting member, the battery module extends through an aperture of the plurality of second apertures and the respective aperture of the plurality of first apertures.

In an embodiment, the holding structure may comprise one or more supporting members extending between the at least one side member and the at least one mounting member that are configured to partly support a weight of the one or more battery modules when the one or more battery modules are installed within the holding structure.

In an embodiment, the holding structure may comprise one or more enclosures extending between the at least one side member and the at least one mounting member that are configured to enclose the one or more battery modules and partly support a weight of the one or more battery modules when the one or more battery modules are installed within the holding structure.

In an embodiment of the holding structure, at least one battery module of the plurality of battery modules is fixed between the two side members.

In an embodiment of the holding structure, at least one battery module has a battery capacity of 10 kWh.

In an embodiment of the holding structure, each of the plurality of battery modules include a plurality of individual battery cells and a case that encloses the plurality of individual battery cells.

Embodiments may include combinations of the above features.

In another aspect, the disclosure describes an electric vehicle for housing a plurality of battery modules, the electric vehicle comprising: a holding structure forming at least part of a chassis of the vehicle for housing a plurality of battery modules, the holding structure comprising: two side members, at least one side member of the two side member defining one or more first apertures for selectably receiving one or more battery modules of the plurality of battery modules; at least one cross member that extends between the two side members; and at least one mounting member projecting from the at least one cross member, the at least one mounting member is parallel to the two side members and that defines a plurality of second apertures that are each laterally displaced from a respective aperture of the plurality of first apertures; wherein when a battery module is received by the at least one mounting member, the battery module extends through an aperture of the plurality of second apertures and the respective aperture of the plurality of first apertures; and wherein the holding structure is located between front wheels of the vehicle and rear wheels of the vehicle.

In an embodiment, the electric vehicle comprises: a rocker panel of the vehicle that is configured to be adjustably attached to the vehicle.

In an embodiment, the electric vehicle comprises: one or more supporting members extending between the at least one side member and the at least one mounting member that are configured to partly support a weight of the one or more battery modules when the one or more battery modules are installed within the holding structure.

In an embodiment, the electric vehicle comprises: one or more enclosures extending between the at least one side member and the at least one mounting member that are configured to enclose the one or more battery modules and partly support a weight of the one or more battery modules when the one or more battery modules are installed within the holding structure.

In an embodiment of the electric vehicle, at least one battery module of the plurality of battery modules is fixed between the two side members.

In an embodiment of the electric vehicle, at least one battery module has a battery capacity of 10 kWh.

In an embodiment, the electric vehicle comprises: at least one door having a door panel defining a compartment configured to house at least one battery module of the plurality of battery modules.

In an embodiment, the electric vehicle comprises: a compartment integrated within a floor of a rear trunk of the vehicle that is configured to house at least one battery module of the plurality of battery modules.

In an embodiment of the electric vehicle, the compartment includes one or more hinges that allow a position of the compartment to be adjusted.

In an embodiment of the electric vehicle, each of the plurality of battery modules include a plurality of battery cells and a case for housing the battery cells. Each of the battery cells may be spaced from an adjacent battery cell of the battery cells to define a respective interior space therebetween to allow heat dissipation. Each of the plurality of battery modules may comprise a plurality of cooling fins that each extend from an interior of the case to an exterior of the case. The case of each of the one or more battery modules may have a plurality of openings to allow each of the plurality of cooling fins to extend through a respective opening of the plurality of openings. The plurality of fins may extend below the chassis of vehicle to provide cooling to the corresponding battery module.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 6A and 6B are each a cross-sectional view of embodiments of the battery module installed within the holding structure of FIG. 5 taken along line 6-6 of FIG. 5;

DETAILED DESCRIPTION

The following description discloses vehicles, battery module holding structures and battery modules that allow for selective installation and removal of battery modules in a vehicle. A holding structure of a vehicle is disclosed herein that is configured to selectively accommodate one or more battery modules. Vehicle may allow a driver to tailor a number of battery modules to be inserted into the vehicle based on specific situations to minimize an amount of electrical energy consumption. Holding structure and battery modules described herein may promote cooling of battery modules to prevent overheating of battery modules.

The term "substantially" as used herein may be applied to modify any quantitative representation which could permissibly vary without resulting in a change in the basic function to which it is related.

Figure 1:
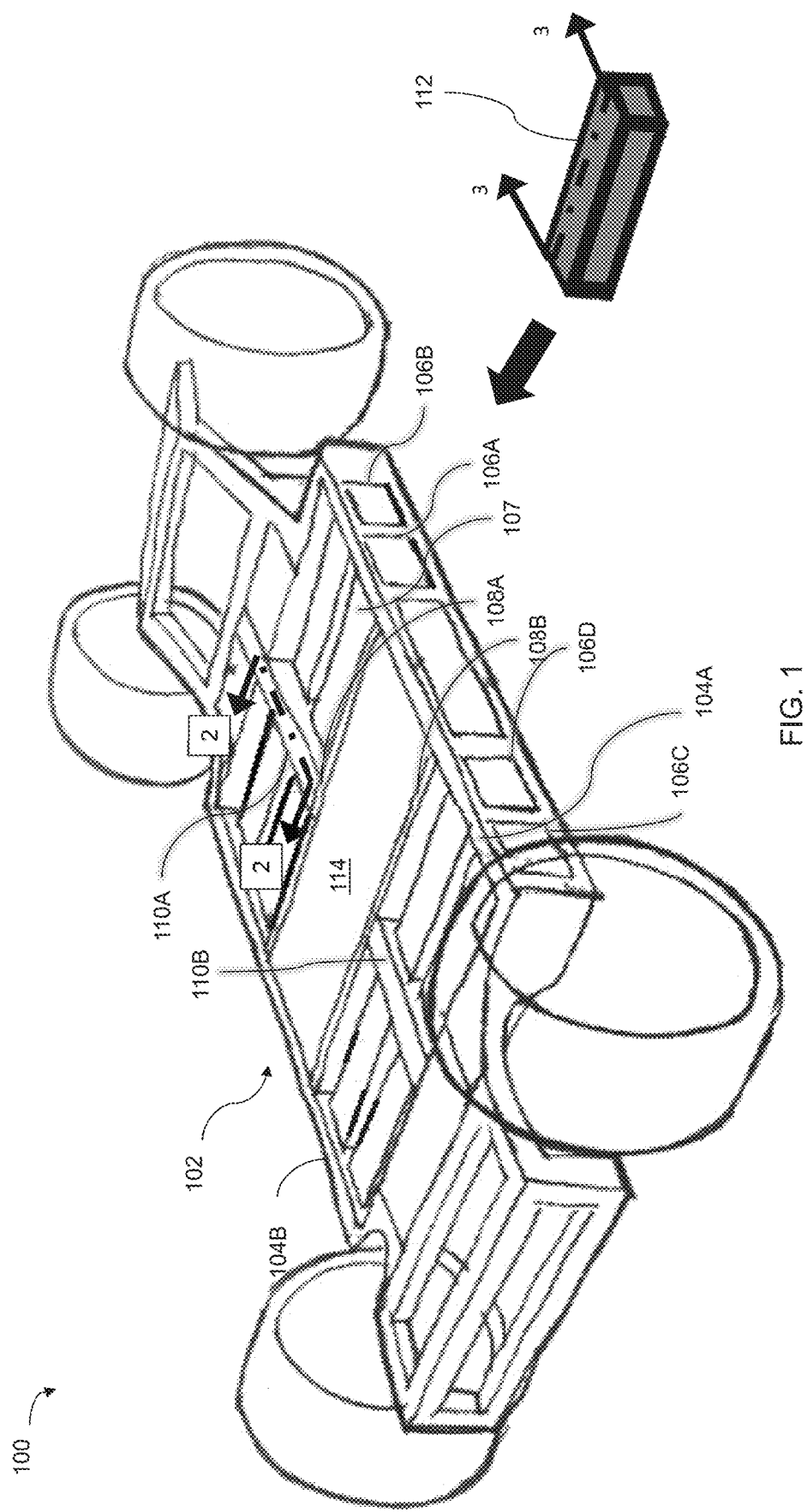
FIG. 1 is a perspective view of a holding structure forming part of a chassis of a vehicle for housing battery modules.

FIG. 1 shows a perspective view of holding structure 102 forming at least part of a chassis of vehicle 100 for housing a plurality of battery modules. Holding structure 102 may be disposed between the front wheels and rear wheels of vehicle 100.

Holding structure 110 may have side members 104A, 104B (also referred generally hereinafter as "side members 104"). As depicted, side member 104A may define a plurality of apertures 106A-106D (also referred generally hereinafter as "apertures 106) for which battery modules may be insertable, such as aperture 106A configured to receive battery module 112. As depicted in the embodiment illustrated in FIG. 1, battery module 112 may have a uniform cross-section that is rectangular. Similarly, aperture 106A may define a rectangular periphery. A cross-sectional area of aperture 106A may be substantially the same or larger than a cross-sectional area of battery module 112 to allow insertion of battery module 112 through aperture 106A. Although battery module 112 has a rectangular cross-section in this embodiment, it should be understood that battery module 112 may have a cross-section that is of a different shape, for instance the cross-section may be circular such as battery module 312 shown in FIG. 8.

Holding structure 102 may have one or more cross members 108A, 108B (also referred generally hereinafter as cross members "108") attached to side members 104. The cross members 108 may extend between side members 104. Holding structure 102 may also have mounting member 110A, 110B (also referred generally hereinafter as mounting members "110") attached to respective cross members 108. As depicted, mounting member 110A may project from cross member 108A and may be parallel with side members 104. Side members 104 and mounting members 110 may be attached to cross members 108 by welding, using adhesives or mechanical fastening. It is understood that other attachment methods or joining methods may be suitable.

As depicted in FIG. 1, holding structure 102 may have battery module 114 fixed between cross members 104A and 104B. Battery module 114 may be larger and provide more battery power than battery module 112 or other insertable battery modules. In some embodiments, battery module 112 may provide a sufficient amount of electrical energy to permit vehicle 100 to drive short distance.

In some embodiments, battery module 112 may be installed within holding structure 102 such that battery module 112 partly extends through aperture 106A and another aperture 116A (shown in FIG. 2) defined within mounting member 110A.

Figure 2:
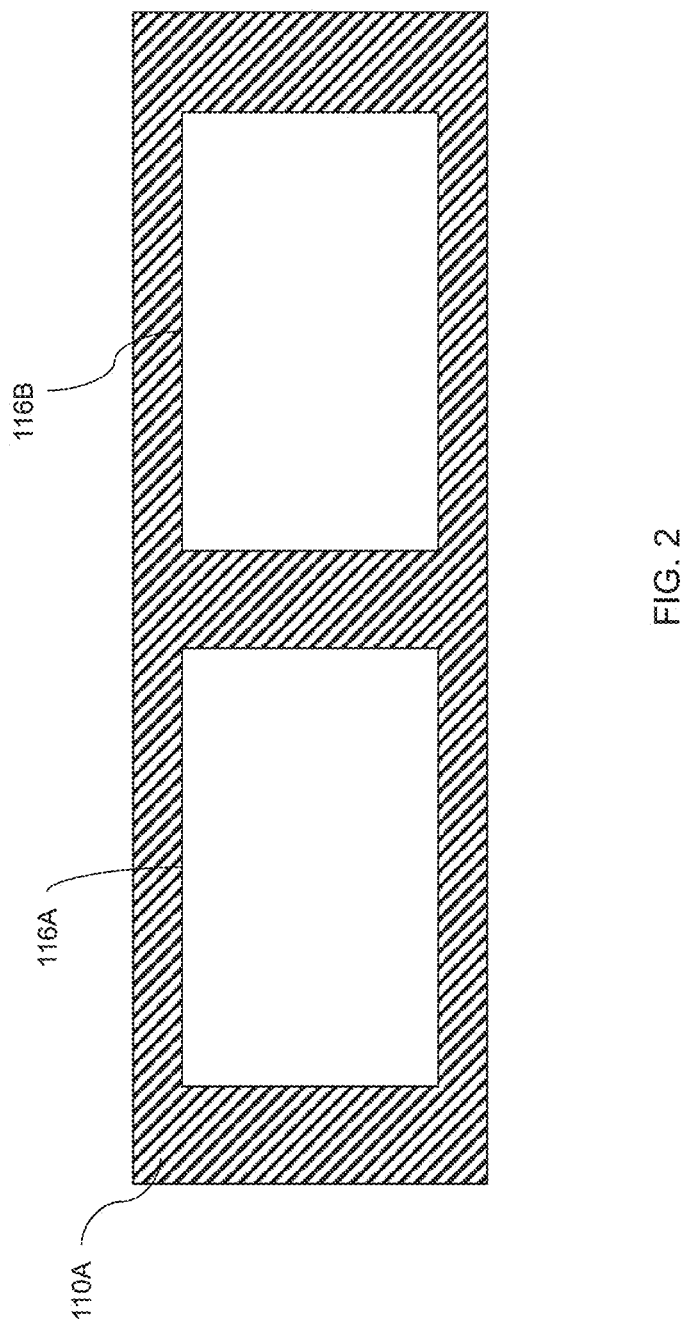
FIG. 2 is a cross-sectional view of a mounting member of holding structure of FIG. 1 taken along line 2-2 in FIG. 1.

FIG. 2 is a cross-sectional view of mounting member 110A of FIG. 1 taken along line 2-2 in FIG. 1. Aperture 116A may be laterally spaced from aperture 106A. In some embodiments, cross-sectional area of aperture 116A may be substantially the same as a cross-sectional area of aperture 106A. In some embodiments, mounting member 110 may be at least partially hollow and define a channel to contain wiring and/or comprise electrical connection components to convey power from the inserted battery modules to an electric motor of vehicle 100. When battery module 112 is installed within holding structure 102 such that battery module 112 partly extends through aperture 106A and another aperture 116A, side member 104A and mounting member 110A may partly support a weight of battery module 112.

In some embodiments, holding structure 102 may have an enclosure 107 configured to guide battery module 112 during insertion. Enclosure 107 may also enclose battery module 112 and partly support a weight of battery module 112 when it is installed in holding structure 102. Enclosure 107 may extend from side member 104A to mounting member 110A and may define a channel extending completely through enclosure 107 for receiving and housing battery module 112 when it is installed in holding structure 102. Enclosure 107 may be attached to side member 104A and mounting member 110A by welding, use of adhesives or mechanical fastening. It is understood that other attachment methods or joining methods may be suitable.

Figure 3:
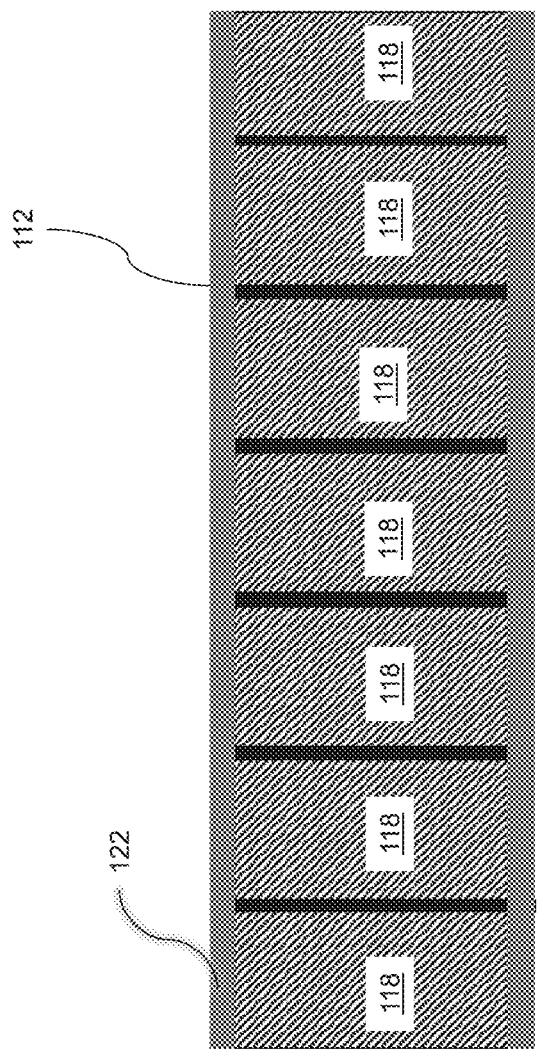
FIG. 3 is a cross-sectional view sectional view taken along line 3-3 of a battery module depicted in FIG. 1 according to one embodiment.

FIG. 3 is a cross-sectional view taken along line 3-3 of battery module 112 depicted in FIG. 1 according to one embodiment. Battery module 112 may include a plurality of individual battery cells 118 and case 122 for housing the individual battery cells. Although FIG. 3 depicts only 6 battery cells within battery module 112, it should be understood that battery module 112 may have a different number of battery cells. In some embodiments, case 122 may completely enclose battery cells 118.

Although FIG. 1 depicts only battery module 112 being insertable within holding structure 112, it should be understood that a plurality of battery modules may be insertable within holding structure 102 through apertures 106B-106D for example. Further, side member 104B may define apertures similar to 106A-106D to receive battery modules. In some embodiments, side member 104A and side member 104B may have substantially identical apertures that are laterally disposed from one another.

In some embodiments, holding structure 102 may be configured to accommodate 9 batteries including fixed battery module 114. However, it will be appreciated that holding structure 102 may be configured to accommodate another number (e.g. 5, 9, 13, 17) of battery modules.

Currently on the market, some electric vehicles have battery packs (i.e. plurality of battery modules) with a battery capacity of roughly 100 kwh that can weigh 1000 to 1500 lbs. However, often drivers do not need to leverage all of the power that can be supplied by these battery packs, for instance in a case of a short distance drive. In an example, the average daily commute may require a vehicle to use 10 kwh of energy (i.e. 10% of a battery with a capacity of 100 kwh of energy) which only leverages a small portion of a battery pack. Vehicle 100 described herein aims to minimize amount of power consumption by vehicle 100 when driving. Vehicle 100 may allow a driver to tailor a number of battery modules to be inserted into vehicle 100 based on specific situations to minimize an amount of electrical energy consumption by reducing weight of the vehicle at a given time. Decrease in weight of the vehicle may decrease the power consumption of vehicle when driving.

An increase in the number of battery modules inserted into holding structure 102 may increase an amount of power available to vehicle 100, but also increase a weight of vehicle 100. This increase in weight of vehicle 100 may increase power consumption of vehicle 100 when driving. However, in some situations, it may be desirable to insert additional battery modules into holding structure 102, despite the increase in weight, such as for travelling longer distances.

In one embodiment, vehicle 100 may have no battery modules inserted into holding structure 102 and may rely on fixed battery module 114 alone to supply power to the electric motor of vehicle 100. In this embodiment, vehicle 100 may be completing a short distance that does not need to leverage additional inserted battery modules. Fixed battery module 114 may provide sufficient power to complete the short distance daily drive. In some embodiments, fixed battery module 114 may have a battery capacity of 8-15 kwh to provide sufficient power for daily commuting. In an embodiment, fixed battery module 114 may have a battery capacity of 10 kwh. In some embodiments, vehicle 100 may use electrical energy generated by solar panels (shown in FIG. 12 and discussed later).

In another embodiment, vehicle 100 may have one or more battery modules inserted into holding structure 102. Vehicle 100 may rely on the one or more battery modules inserted and fixed battery module 114 to supply power to the electric motor of vehicle 100. In this embodiment, vehicle 100 may be completing a long-distance drive that would require vehicle 100 to leverage the energy from the one or more battery modules and fixed battery module 114 to complete the drive. The driver may not want to stop vehicle 100 during his/her trip to charge the battery modules of vehicle 100. If additional energy is still needed to complete a drive, vehicle 100 might also rely on other battery modules that may be inserted within door 400 (shown in FIGS. 9A-9B and discussed later) of vehicle 100, quarter trim panel of vehicle 100 (discussed later), and/or rear/front trunk (shown in FIGS. 10-11 and discussed later) of vehicle 100. In some embodiments, vehicle 100 may use electrical energy generated by solar panels (shown in FIG. 12 and discussed later).

As previously described, vehicle 100 may allow a driver to tailor a number of battery modules to be inserted into vehicle 100 based on specific situations to minimize an amount of electrical energy consumption. In some embodiments, insertable battery modules may be significantly lighter and provide less energy than fixed battery module 114. Lighter insertable battery modules may provide more control of a weight of vehicle 100 as battery modules are inserted into vehicle 100. Lighter battery modules may allow more freedom in obtaining a desired power to weight ratio of vehicle 100.

In some cases, automotive manufacturers may provide vehicles to their customers containing only fixed battery module 114. Individual battery modules that may be inserted within holding structure 102, door 400 (shown in FIGS. 9A-9B and discussed later) of vehicle 100, quarter trim panel of vehicle 100 (discussed later), and rear/front trunk of vehicle 100 (shown in FIGS. 10-11 and discussed later) may be purchased or rented from the automotive manufacturer on an as-needed basis, for example from a service station.

Figure 4:
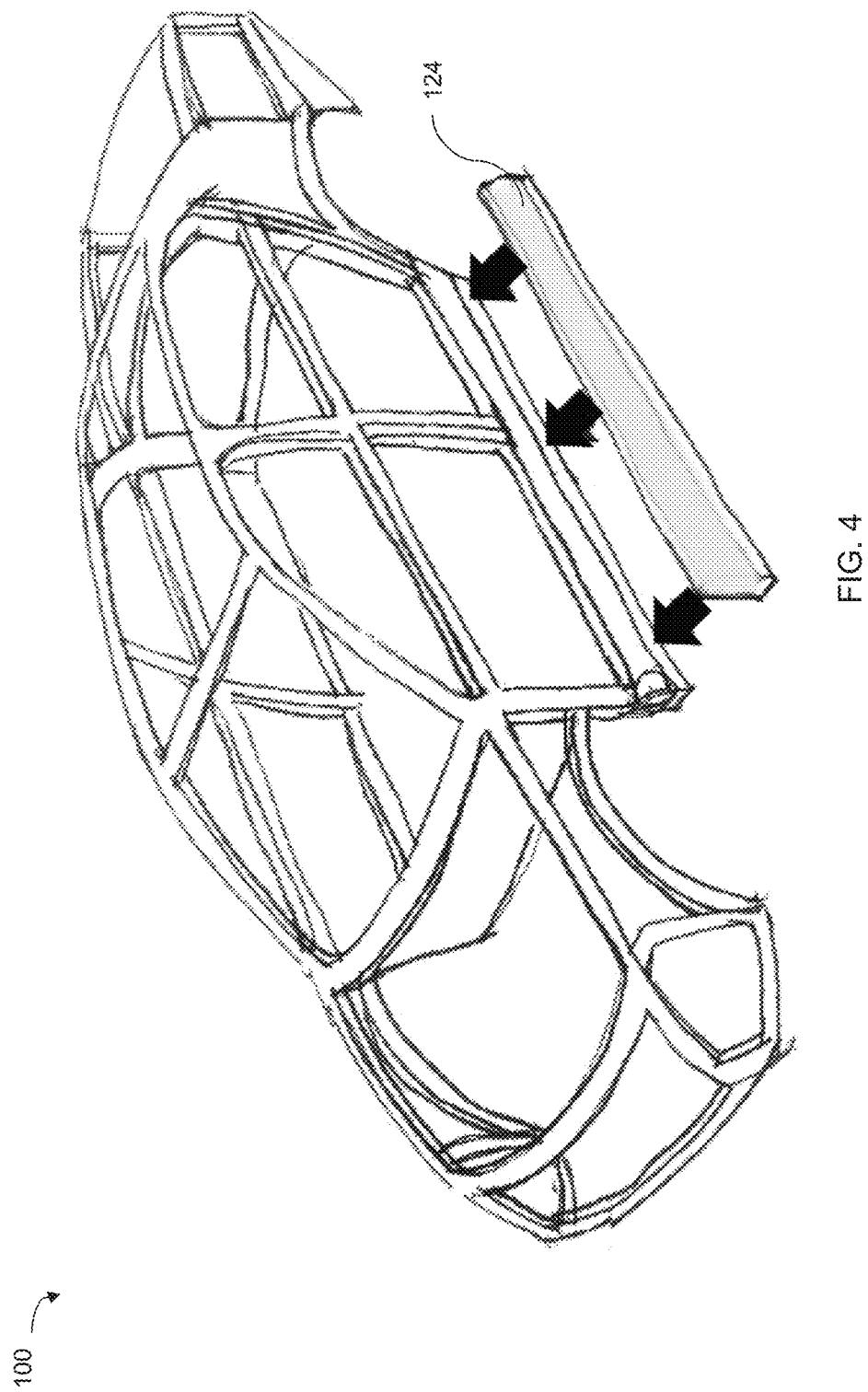
FIG. 4 depicts a perspective view of a vehicle having an adjustably attached.

In some embodiments, side members 104 may be accessible by a driver of vehicle 100 to permit the insertion of battery modules such as battery module 112 into holding structure 102. However, in other embodiments, vehicle 100 may have removable or adjustable rocker panels on one or both sides of vehicle 100 that have to be removed or adjusted to allow the insertion of battery modules in holding structure 102. FIG. 4 depicts a rocker panel 124 on one side of vehicle 100 that may be removable from vehicle 100. Rocker panel 124 may be secured to vehicle 100 using any suitable attachment means that would permit repeated attachment and removal of rocker panel to and from vehicle 100. Rocker panel 124 may be fastened to one or more reinforcements panels (e.g. side sill reinforcement panels, center pillar reinforcement panels) of vehicle 100. In some embodiments, rocker 124 may be mechanically fastened to the reinforcement panels using for example one or more bolts, screws, magnets, clips (e.g. Harley™ clip). In other embodiments, rocker panel 124 may be spring loaded in place within one or more holding members attached to vehicle 100.

In alternate embodiments, rocker panel may be hinged at one end to the one or more reinforcements panels. The rocker panel may be adjustable to be positioned at various positions. Rocker panel may be in a position that prevents access to holding structure 102 during vehicle operation. However, rocker panel may be adjusted when inserting battery modules into holding structure 102 to allow insertion of the battery modules through apertures 106 for example.

Figure 5:
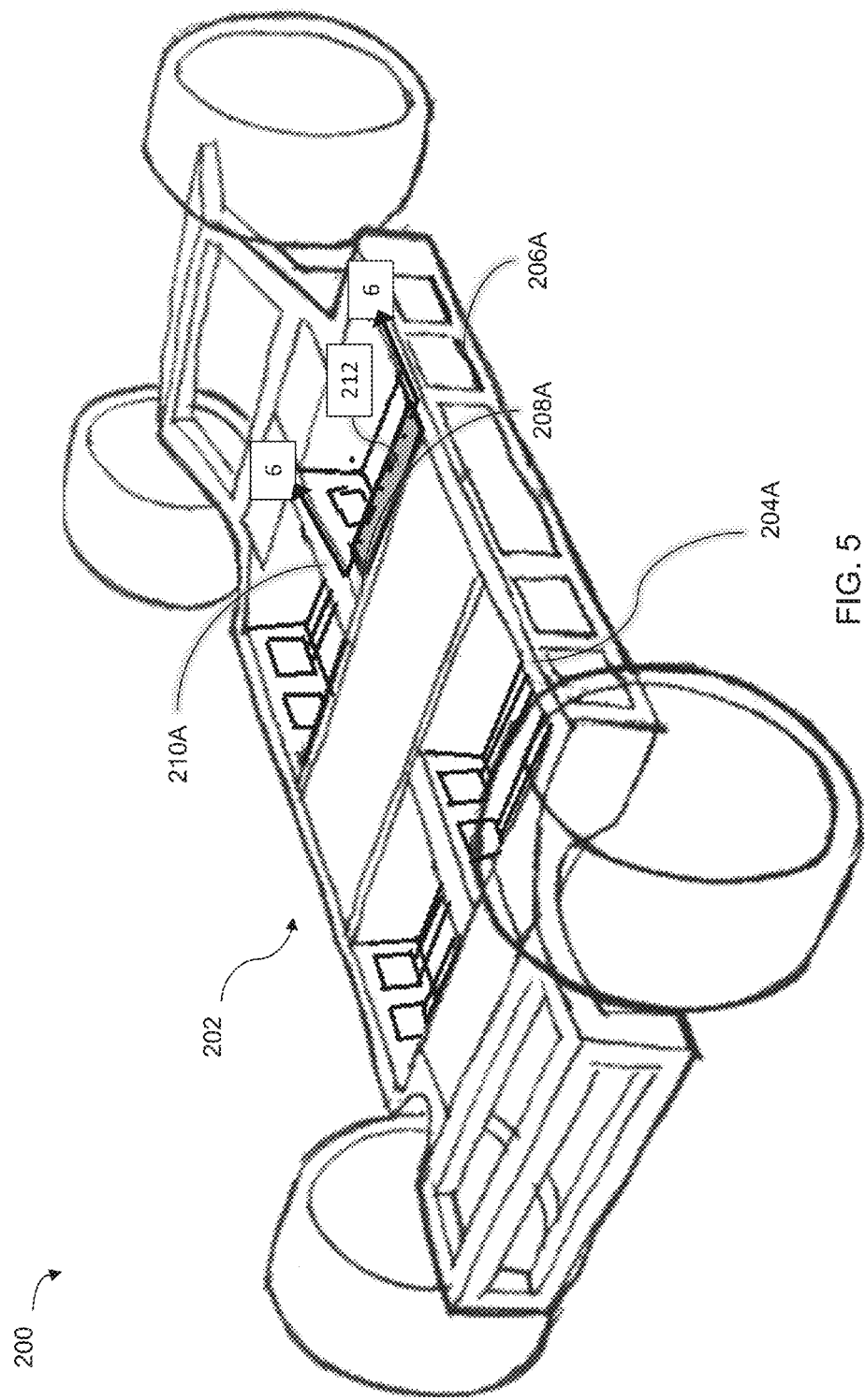
FIG. 5 is a perspective view of a holding structure forming part of a chassis of a vehicle having a battery module installed within the holding structure.

FIG. 5 is a perspective view of another holding structure 202 forming part of a chassis of a vehicle 200 having a battery module 212 installed within the holding structure 202. In reference to FIGS. 1-4, some elements of holding structure 102 are common to holding structure 102. Reference character of like elements have been incremented by 100 and their description is not repeated.

Figure 6A:
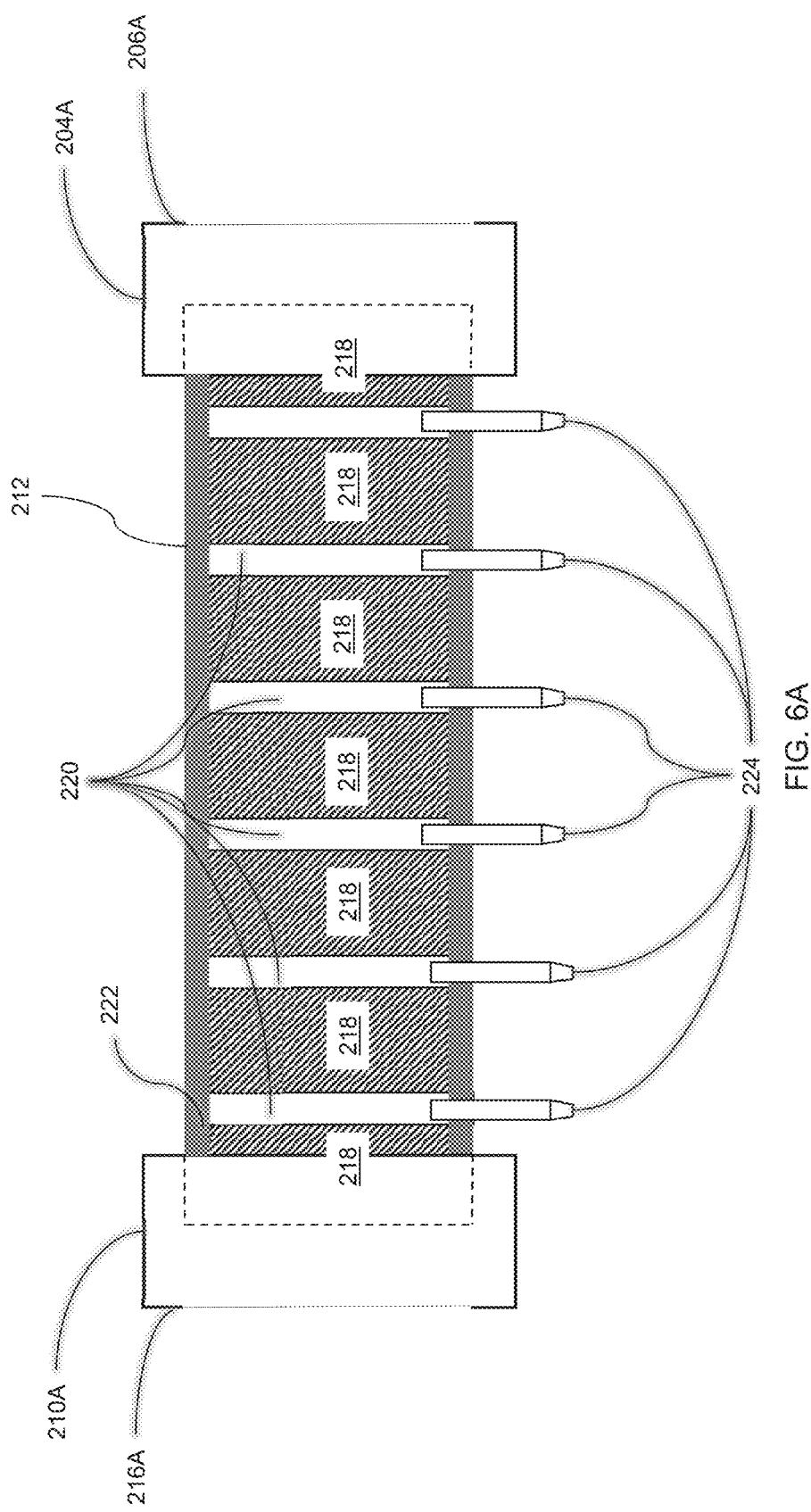

FIG. 6A is a cross-sectional view of battery module 212 installed within holding structure 202 of FIG. 5 taken along line 6-6 of FIG. 5. Battery module 212 may be configured to partly extend through aperture 206A and another aperture 216A defined within mounting member 210A when battery module 212 is installed within holding structure 202. Side member 204A and mounting member 210A may partly support a weight of battery module 212.

Battery module 212 may include a plurality of individual battery cells 218 and case 222 for housing the individual battery cells. Battery cells 218 may be spaced from one another to define interior spaces 220.

Battery module 212 may overheat for a variety of reasons resulting in damage to battery module 212. For instance, outside temperature conditions may contribute to overheating battery module 212. Also, vehicle 200 travelling at high speeds may overexert battery module 212 resulting in overheating. In some cases, overheating may reduce an energy efficiency of a vehicle.

To mitigate the risk of overheating, battery module 212 may include a plurality of cooling fins 224 that extend from interior spaces 220 defined between adjacent battery cells 218 through case 222 to an exterior of vehicle 200. Case 222 may define small openings to allow cooling fins 224 to extend through case 222. Cooling fins 224 may be an alloy or other material having a high thermal conductivity to allow heat transfer from battery module 212 to an exterior of vehicle 200. Cooling fins may be made of an aluminum alloy for example. In some embodiments, cooling fins 224 may extend from interior spaces 220 to below holding structure 202 and a chassis of vehicle 200. Heat generated by battery cells 218 may be transferred into interior spaces 220 and subsequently to cooling fins 224. When vehicle 200 is moving, cool air may flow under holding structure 202 and pass cooling fins 224. The heat transferred to cooling fins 224 from battery cells 218 may be removed from cooling fins 224 when cool air passes cooling fins 224 (i.e. convection cooling).

FIG. 6B is a cross-sectional view of another embodiment of the battery module 212 installed within the holding structure 202 of FIG. 5 taken along line 6-6 of FIG. 5. In the example in FIG. 6B, at least one cooling fin 224 may extend from a corresponding battery cell 218. At least one cooling fin 224 may extend from each battery cell 218. Heat generated by each battery cell 218 may be transferred by conduction to the corresponding at least one cooling fin 224. Similar to the above example, cooling fins 224 may extend from battery cells 218 to below holding structure 202 and chassis of vehicle 200. When vehicle 200 is moving, cool air may flow under holding structure 202 and pass cooling fins 224. The heat transferred to cooling fins 224 from battery cells 218 may be removed from cooling fins 224 when cool air passes cooling fins 224 (i.e. convection cooling).

Figure 7:
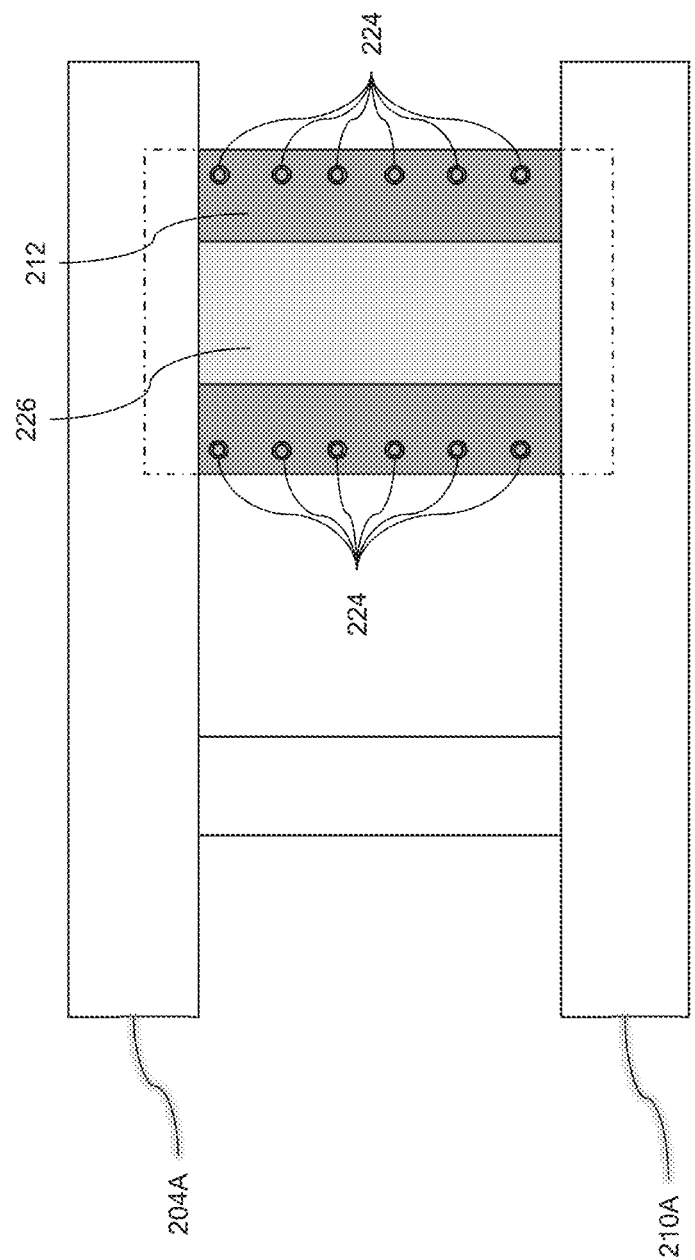
FIG. 7 is a bottom view of the holding structure of FIG. 4 taken between a mounting member and side member of the holding structure having a battery module 212 installed within the holding structure.

FIG. 7 is a bottom view of holding structure 202 of FIG. 4 taken between mounting member 210A and side member 204A having battery module 212 installed within holding structure 202. Battery module 212 may be partly supported by supporting member 226 extending between side member 204A and mounting member 210A. Supporting member 226 may be attached to side member 204A and mounting member 210A by welding, use of adhesives or mechanical fastening. It is understood that other attachment methods and joining methods may be suitable. Cooling fins 224 may be located near edges of battery module 212 such that they do not interfere with supporting member 226.

In some embodiments, holding structure 202 may omit support member 226 and have an enclosure similar to enclosure 107 of FIG. 1. This enclosure may completely enclose battery module 212. However, this enclosure may define small openings to allow cooling fins 224 to extend through the enclosure. In this case, cooling fins 224 may protrude through case 222 and the enclosure surrounding battery module 212 to promote cooling of battery module 212.

Figure 8:
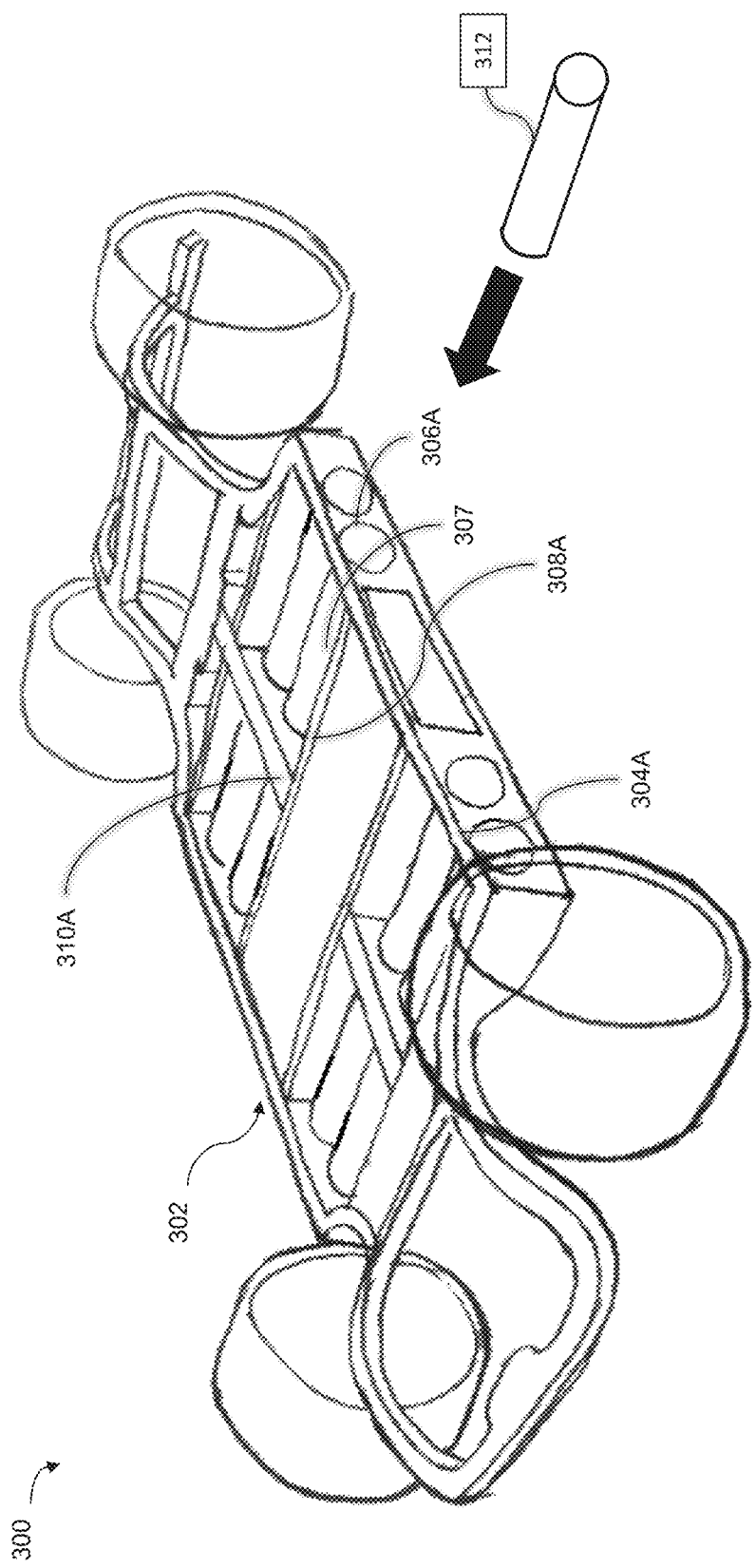
FIG. 8 is a perspective view of another holding structure forming part of a chassis of a vehicle having a battery module that has a uniform circular cross-section and that is installed within the holding structure.

FIG. 8 is a perspective view of another holding structure 302 forming part of a chassis of a vehicle 300 having a battery module 312 installed within the holding structure 302. In reference to FIGS. 1-4, some elements of holding structure 302 are common to holding structure 302. Reference character of like elements have been incremented by 200 and their description is not repeated. As depicted in FIG. 8, battery module 312 may have a uniform circular cross-section. A periphery of aperture 306A may be circular and aperture 306A may have a cross-sectional area that is substantially the same or larger than a cross-sectional area of battery module 312 to allow insertion of battery module 312 through aperture 306A. Battery module 312 may be inserted within aperture 306A and enclosed within an enclosure 307.

Figure 9B:
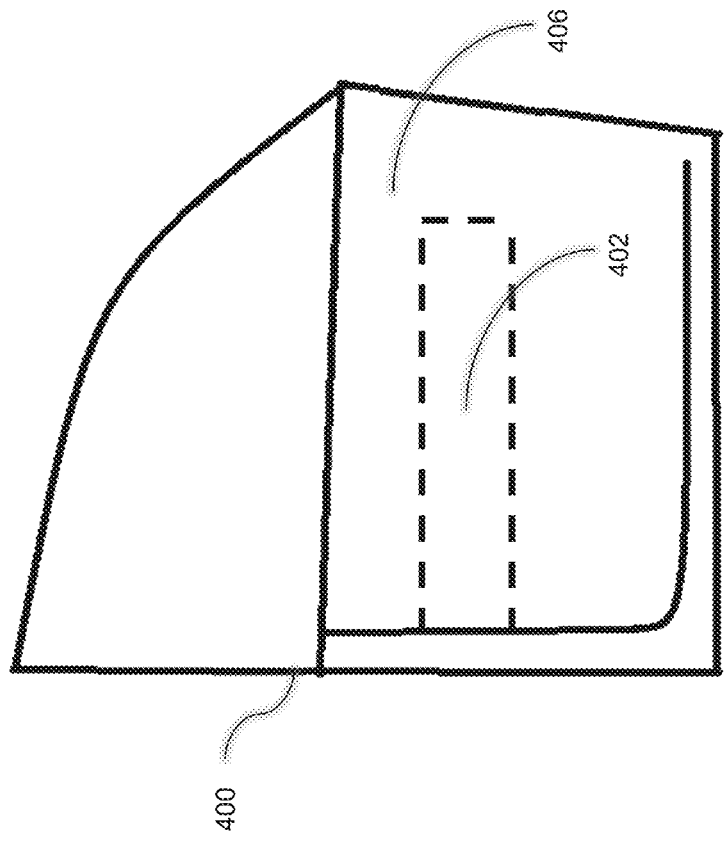
FIGS. 9A and 9B show a side view and back view, respectively of a door of a vehicle defining a compartment for housing a battery module.
Figure 9A:
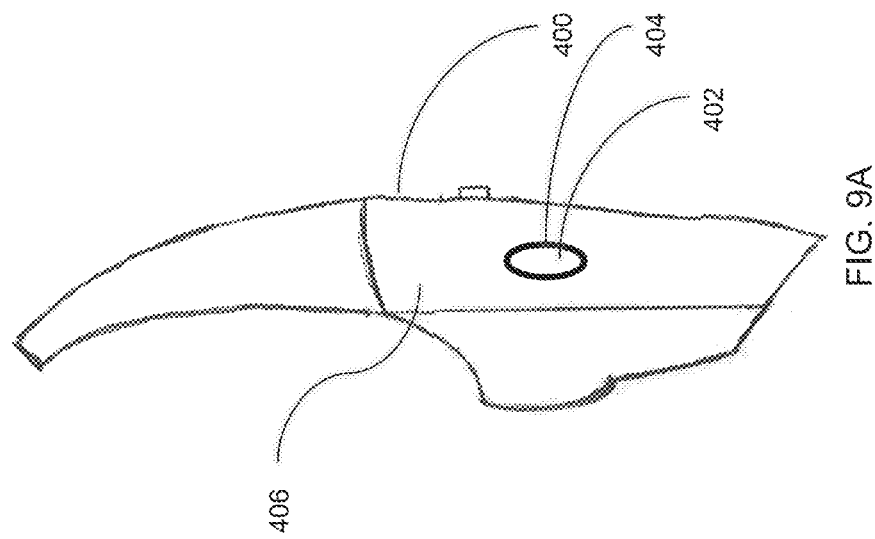

FIGS. 9A and 9B show a side view and back view, respectively of door 400 of vehicle 100 defining compartment 402 for housing a battery module. Compartment 402 may be defined within a door panel 406 of door 400. A battery module may be inserted within an aperture 404 defined in a side surface of door panel 406. Aperture 404 may be configured to receive a battery of different shapes, e.g. a rectangular prismatic battery, cylindrical battery, or a battery having an oval cross-section. The side surface of door panel 406 may only be exposed when door 400 of vehicle 100 is opened. In some embodiments, compartment 402 may be spring loaded to hold a battery module in a desired position within compartment 402.

In some embodiments, a similar compartment to compartment 402 may be defined within a rear quarter trim panel of vehicle 100. In some cases, a battery module may be inserted within an aperture defined in a side surface of the quarter trip panel. The side surface of the quarter trim panel may only be exposed when a rear door adjacent the quarter trim panel is opened.

Figure 11:
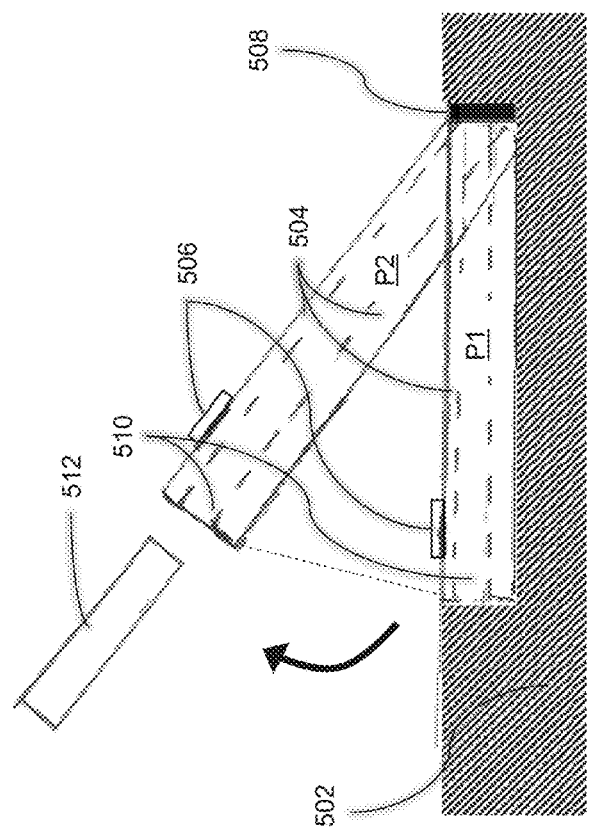
FIG. 11 shows a partial cross-sectional view of a trunk floor of a vehicle and a compartment integrated within the trunk floor taken between lines 11-11 of FIG. 10.
Figure 10:
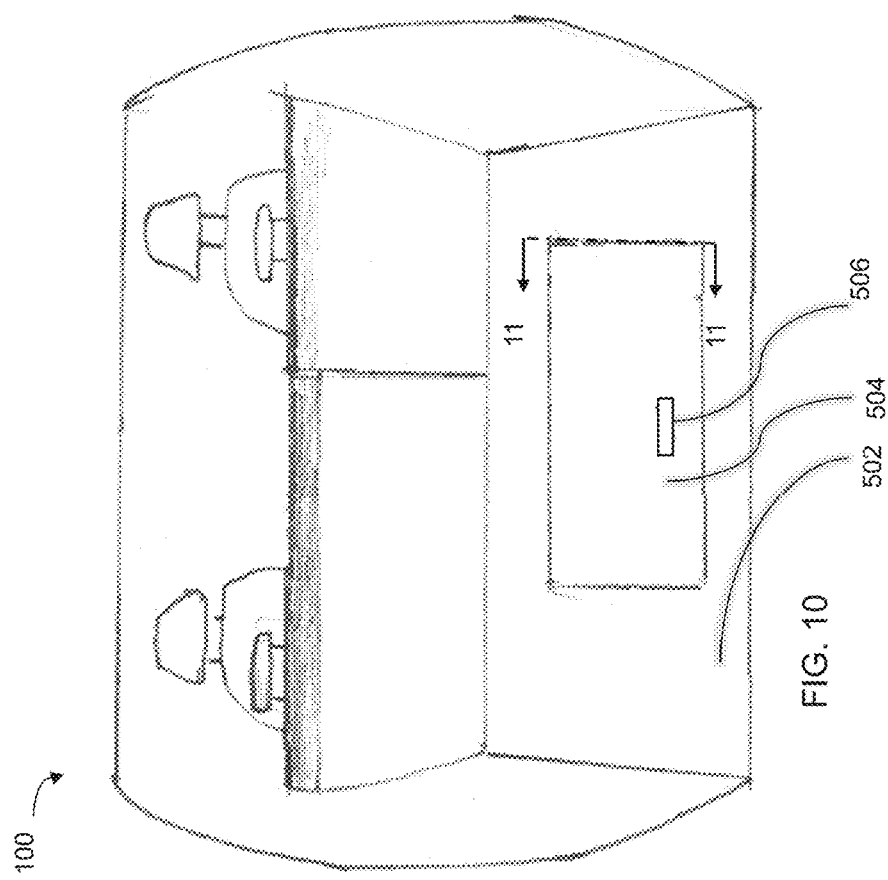
FIG. 10 shows a back view of an interior of a vehicle.

FIG. 10 shows a back view of an interior of vehicle 100. As depicted, compartment 504 for housing one or more battery modules may be defined within or beneath a floor 502 of the rear trunk of vehicle 100. FIG. 11 shows a partial cross-sectional view of floor 502 of vehicle 100 and compartment 504 taken between lines 11-11 of FIG. 10. FIG. 11 shows compartment 504 at two different positions P1, P2. Compartment 504 may have one or more hinges 508 to facilitate adjustment of compartment 504 between positions P1, P2. Compartment 504 may have handle 506 to allow a driver to adjust the position of compartment 504. At position P2, battery module 512 may be inserted into channel 510 defined within compartment 504. After battery module 512 is inserted into channel 510 of compartment 504, compartment 504 may be adjusted to be at position P1. At position P1, a top surface of compartment 504 may be flush with a surface of trunk floor 502 to conserve space in the rear trunk of vehicle. In some embodiments, a compartment similar to compartment 504 may be installed in a front trunk of vehicle 100. Although FIG. 11 shows only battery module 512 being insertable within channel 510 of compartment 504, it should be understood that a plurality of battery modules may be insertable within a plurality of respective other channels defined within compartment 504.

Figure 12:
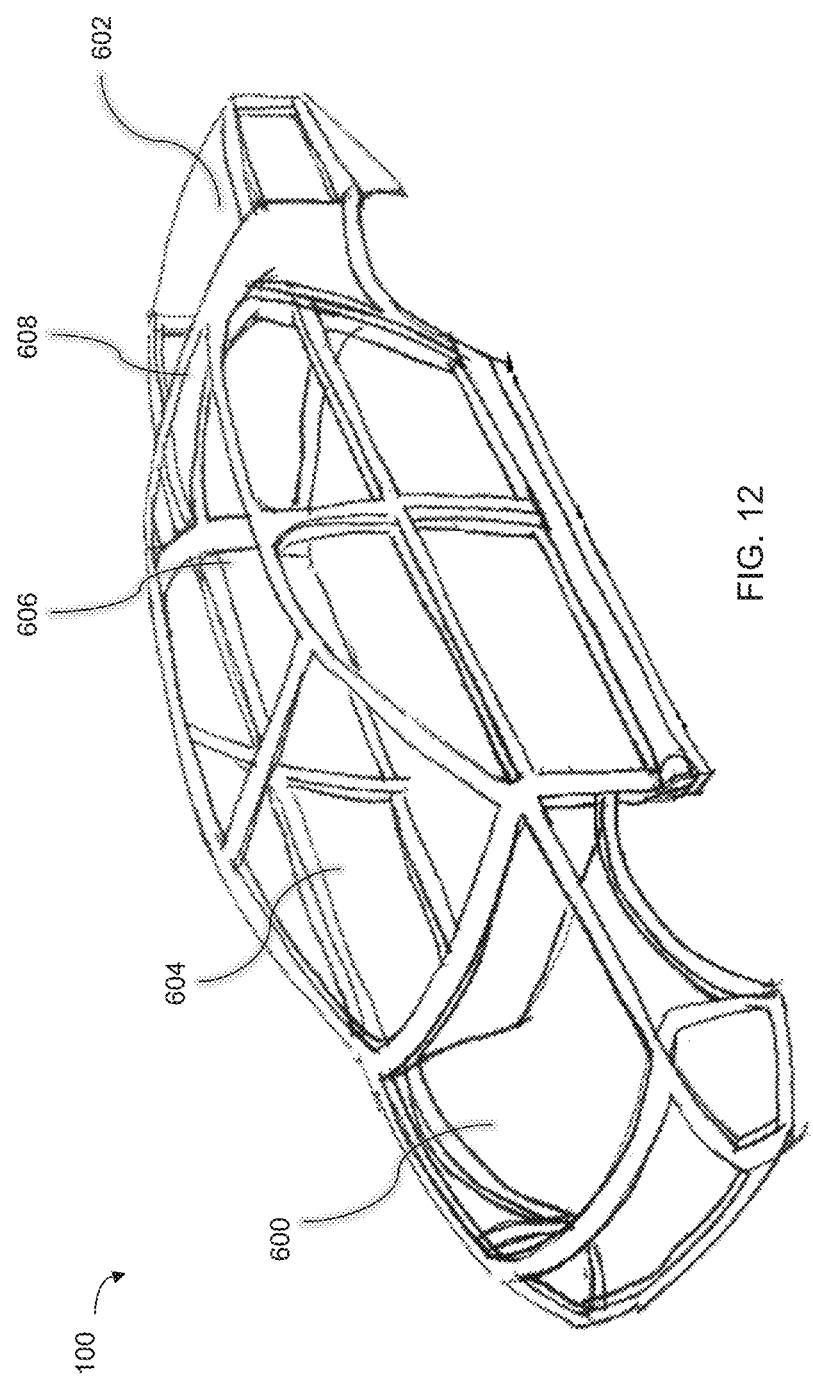
FIG. 12 shows a perspective view of a vehicle having a plurality of solar panels integrated within the vehicle.

FIG. 12 shows a perspective view of vehicle 100 having a plurality of solar panels for converting solar energy into electrical energy for supplying power to electric motors of vehicle 100. Vehicle 100 may include solar panels that form part of a hood 600 and trunk 602, respectively of vehicle 100. Vehicle 100 may have transparent solar panels. As depicted, vehicle 100 may have transparent solar panels that form part of a windshield 604, sunroof 606, and back window 608. The power generated by these solar panels may supplement power generated by fixed battery module 114 and insertable battery modules such as battery module 112. In some cases, solar panels and fixed battery module 114 may provide a sufficient amount of electrical energy, eliminating a need to insert additional battery modules into vehicle 100.

When battery modules are housed within a single battery pack, the battery modules are often packed tightly together and may be stacked. This may increase chances of overheating. A surface area of the battery modules of vehicle 100 distributed in holding structure 112, door 400, quarter trim panel and front/rear trunks of vehicle 100 may be larger than a surface area of these battery modules if they were housed in a single battery pack. This increased surface may allow for increased heat dissipation to prevent overheating of battery modules.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A holding structure forming at least part of a vehicle chassis for housing a plurality of battery modules, the holding structure comprising:
   two side members, at least one side member of the two side members defining one or more first apertures for removably receiving one or more battery modules of the plurality of battery modules;
   at least one cross member that extends between the two side members; and
   at least one mounting member projecting from the at least one cross member, the at least one mounting member is parallel to the two side members and defines a plurality of second apertures that are each laterally displaced from a respective aperture of the plurality of first apertures;
   wherein when a battery module is received by the at least one mounting member, the battery module extends through an aperture of the plurality of second apertures and the respective aperture of the plurality of first apertures.

2. The holding structure of claim 1 comprising:
   one or more supporting members extending between the at least one side member and the at least one mounting member that are configured to partly support a weight of the one or more battery modules when the one or more battery modules are installed within the holding structure.

3. The holding structure of claim 1 comprising:
   one or more enclosures extending between the at least one side member and the at least one mounting member that are configured to enclose the one or more battery modules and partly support a weight of the one or more battery modules when the one or more battery modules are installed within the holding structure.

4. The holding structure of claim 1, wherein the holding structure comprises a battery module fixed between the two side members.

5. The holding structure of claim 4, wherein the at least one battery module has a battery capacity of approximately 8-15 kWh.

6. The holding structure of claim 1, wherein each of the plurality of battery modules include a plurality of individual battery cells and a case that encloses the plurality of individual battery cells.

7. An electric vehicle for housing a plurality of battery modules, the electric vehicle comprising:
- a holding structure forming at least part of a chassis of the vehicle for housing a plurality of battery modules, the holding structure comprising:
  - two side members, at least one side member of the two side member defining one or more first apertures for selectably receiving one or more battery modules of the plurality of battery modules;
  - at least one cross member that extends between the two side members; and
  - at least one mounting member projecting from the at least one cross member, the at least one mounting member is parallel to the two side members and that defines a plurality of second apertures that are each laterally displaced from a respective aperture of the plurality of first apertures;
- wherein when a battery module is received by the at least one mounting member, the battery module extends through an aperture of the plurality of second apertures and the respective aperture of the plurality of first apertures; and
- wherein the holding structure is located between front wheels of the vehicle and rear wheels of the vehicle.

8. The electric vehicle of claim 7 comprising:
a rocker panel of the vehicle that is configured to be adjustably attached to the vehicle.

9. The electric vehicle of claim 7 comprising:
one or more supporting members extending between the at least one side member and the at least one mounting member that are configured to partly support a weight of the one or more battery modules when the one or more battery modules are installed within the holding structure.

10. The electric vehicle of claim 7 comprising:
one or more enclosures extending between the at least one side member and the at least one mounting member that are configured to enclose the one or more battery modules and partly support a weight of the one or more battery modules when the one or more battery modules are installed within the holding structure.

11. The electric vehicle of claim 7, wherein at least one battery module of the plurality of battery modules is fixed between the two side members.

12. The holding structure of claim 11, wherein the at least one battery module has a battery capacity of 10 kWh.

13. The electrical vehicle of claim 7 comprising:
at least one door having a door panel defining a compartment configured to house at least one battery module of the plurality of battery modules.

14. The electrical vehicle of claim 7 comprising:
a compartment integrated within a floor of a rear trunk of the vehicle that is configured to house at least one battery module of the plurality of battery modules.

15. The electric vehicle of claim 14, wherein the compartment includes one or more hinges that allow a position of the compartment to be adjusted.

16. The electrical vehicle of claim 7, wherein each of the plurality of battery modules include a plurality of battery cells and a case for housing the battery cells.

17. The electric vehicle of claim 16, wherein each of the battery cells are spaced from an adjacent battery cell of the battery cells to define a respective interior space therebetween to allow heat dissipation.

18. The electric vehicle of claim 16, wherein each of the plurality of battery modules comprise a plurality of cooling fins that each extend from an interior of the case to an exterior of the case.

19. The electric vehicle of claim 18, wherein the case of each of the one or more battery modules has a plurality of openings to allow each of the plurality of cooling fins to extend through a respective opening of the plurality of openings.

20. The electric vehicle of claim 18, wherein the plurality of fins extend below the chassis of vehicle to provide cooling to the corresponding battery module.

* * * * *